(12) United States Patent
Thalfah et al.

(10) Patent No.: US 10,404,130 B2
(45) Date of Patent: Sep. 3, 2019

(54) ELECTRIC MOTOR

(71) Applicants: Kabushiki Kaisha Toshiba, Minato-ku (JP); Toshiba Infrastructure Systems & Solutions Corporation, Kawasaki-shi (JP)

(72) Inventors: Reza Syahrizal Thalfah, Yokohama (JP); Toshiyuki Oosaki, Fuchu (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 24 days.

(21) Appl. No.: 15/902,668

(22) Filed: Feb. 22, 2018

(65) Prior Publication Data

US 2018/0183296 A1 Jun. 28, 2018

Related U.S. Application Data

(63) Continuation of application No. PCT/JP2016/064296, filed on May 13, 2016.

(30) Foreign Application Priority Data

Aug. 26, 2015 (JP) .................................. 2015-167127

(51) Int. Cl.
  *H02K 5/16* (2006.01)
  *H02K 15/14* (2006.01)
  (Continued)

(52) U.S. Cl.
  CPC ............... *H02K 5/163* (2013.01); *H02K 5/16* (2013.01); *H02K 5/1732* (2013.01); *H02K 7/085* (2013.01);
  (Continued)

(58) Field of Classification Search
  CPC .... H02K 5/1732; H02K 5/16; H02K 15/0006; H02K 15/14
  See application file for complete search history.

(56) References Cited

U.S. PATENT DOCUMENTS

| 4,806,810 A | * | 2/1989 | Hernden | ................ | F16J 15/106 |
|---|---|---|---|---|---|
|   |   |   |   |   | 277/637 |
| 6,091,173 A | * | 7/2000 | Byrd | ..................... | H02K 11/01 |
|   |   |   |   |   | 310/211 |

(Continued)

FOREIGN PATENT DOCUMENTS

| JP | 2008-99491 | 4/2008 |
|---|---|---|
| JP | 2011-172421 | 9/2011 |
| JP | 2012-60794 | 3/2012 |

OTHER PUBLICATIONS

International Search Report dated Jul. 19, 2016 in PCT/JP2016/064296, filed on May 13, 2016 (with English Translation).

*Primary Examiner* — Dang D Le
(74) *Attorney, Agent, or Firm* — Oblon, McClelland, Maier & Neustadt, L.L.P.

(57) ABSTRACT

According to one embodiment, an electric motor includes a rotor supporter which is movable in an axial direction of a central axis of a rotor shaft with respect to a case, and a support member receiver attached to at least one of the rotor shaft and the rotor core so that the rotor supporter is able to come into contact therewith and be separated therefrom, and able to fix the rotor shaft and the rotor core to the rotor supporter when the rotor supporter is in contact therewith.

3 Claims, 7 Drawing Sheets

(51) Int. Cl.
  *H02K 7/08* (2006.01)
  *H02K 5/173* (2006.01)
  *H02K 15/00* (2006.01)
(52) U.S. Cl.
  CPC ......... *H02K 15/0006* (2013.01); *H02K 15/14* (2013.01)

(56) References Cited

U.S. PATENT DOCUMENTS

| | | | |
|---|---|---|---|
| 8,659,215 B2* | 2/2014 | Nagayama | H02K 5/1732 310/401 |
| 8,946,955 B2* | 2/2015 | Cutter, III | H02K 11/22 310/68 B |
| 9,035,517 B2* | 5/2015 | Rittmeyer | H02K 5/1735 310/407 |
| 2012/0062076 A1 | 3/2012 | Nagayama et al. | |
| 2013/0241329 A1 | 9/2013 | Yagi et al. | |

* cited by examiner

ELECTRIC MOTOR

CROSS-REFERENCE TO RELATED APPLICATIONS

This application is based upon and claims the benefit of priority from Japanese Patent Application No. 2015-167127, filed Aug. 26, 2015 and International Application No. PCT/JP2016/064296, filed May 13, 2016; the entire contents all of which are incorporated herein by reference.

FIELD

Embodiments described herein relate generally to electric motor.

BACKGROUND

In railroad vehicles, an electric motor is mounted on a truck disposed under a vehicle body. A rotational force of this electric motor is transmitted to wheels via joints and gear devices, and thereby the railroad vehicle travels.

Generally, an electric motor includes a case, a tubular stator core accommodated in the case, a rotor core disposed on an inner peripheral side of the stator core, and a rotor shaft fixed to the rotor core. The rotor shaft is rotatably supported by a bearing part.

Incidentally, regular maintenance is required for the bearing part which supports the rotor shaft. In general, maintenance of the bearing part requires disassembly of the electric motor with an operation of pulling the rotor core out of the stator core. However, such an operation of pulling out the rotor core from the stator core causes a heavy burden of operation. Therefore, a non-disassembling bearing exchange structure in which maintenance of the bearing part can be performed without pulling out the rotor core from the stator core has been proposed.

However, in a conventional non-disassembling bearing exchange structure, when a mistake is made in operation procedure, a problem such as the rotor core falling out from the stator core may occur. Therefore, an operator has to perform sufficient confirmation work not to make a mistake in the operation procedure. Therefore, an electric motor has room for improvement in terms of facilitating a maintenance operation.

DETAILED DESCRIPTION

Figure 1:
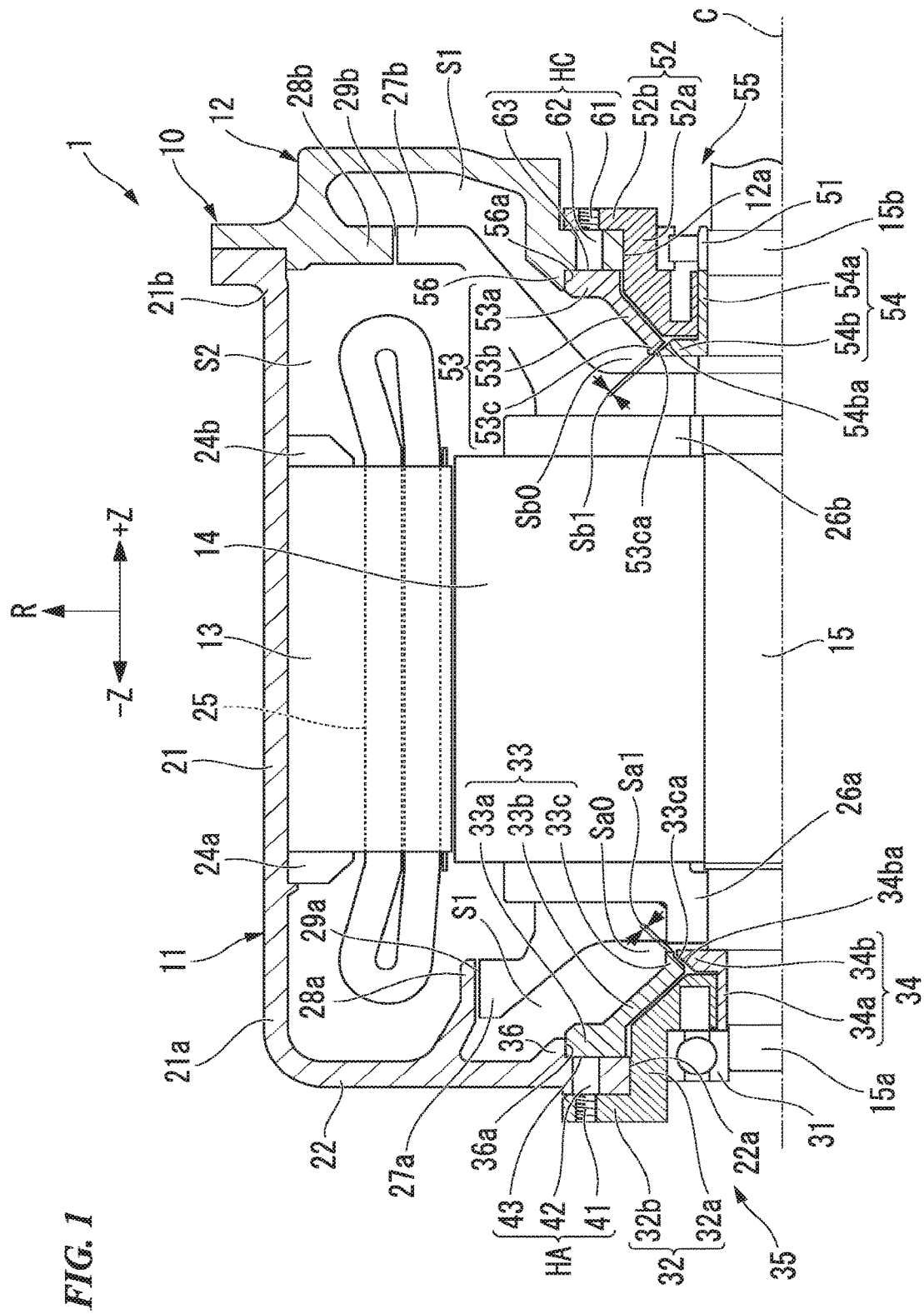
FIG. 1 is a cross-sectional view showing an electric motor of one embodiment.

According to one embodiment, an electric motor includes a stator core, a rotor core, a rotor shaft, a case, a bearing part, a rotor supporter, and a support member receiver. The rotor core is disposed on an inner peripheral side of the stator core. The rotor shaft is fixed to the rotor core. The case accommodates the stator core and the rotor core. The bearing part rotatably supports the rotor shaft. The rotor supporter is disposed inside the case, supported by the case from an outer peripheral side in a radial direction with respect to a central axis of the rotor shaft, and movable in an axial direction of the central axis of the rotor shaft with respect to the case. The support member receiver is attached to at least one of the rotor shaft and the rotor core so that the rotor supporter is able to come into contact therewith and be separated therefrom, and able to fix the rotor shaft and the rotor core to the rotor supporter when the rotor supporter is in contact therewith. The case includes a first through hole in the axial direction of the central axis of the rotor shaft. The rotor supporter includes a contact receiver with which a bolt is able to come into contact, and the contact receiver is disposed to face the first through hole. The bearing part includes a flange facing the case from the outside of the electric motor in the axial direction of the central axis of the rotor shaft and a first screw hole provided in the flange, and is attached to the case so that the first screw hole is aligned with the first through hole.

Hereinafter, an electric motor of an embodiment will be described with reference to the drawings.

FIGS. 1 to 7 show an electric motor 1 according to one embodiment. For example, the electric motor 1 is a main electric motor for a vehicle mounted on a truck of a railroad vehicle to drive the railroad vehicle.

Here, for convenience of description, the +Z direction, the −Z direction, the R direction, and the θ direction are defined with respect to a rotation central axis C (hereinafter referred to as "central axis C") of the electric motor 1. First, the central axis C is an axis passing through a rotation center of a rotor shaft 15 to be described below and can also be regarded as a central axis of the rotor shaft 15. The +Z direction and the −Z direction are an axial direction of the central axis of the rotor shaft 15 and are a direction substantially parallel to the central axis C. For example, the +Z direction is a direction in which an end on a drive side of the rotor shaft 15 protrudes from the electric motor 1. The −Z direction is opposite to the +Z direction. The R direction is a radial direction with respect to the central axis of the rotor shaft 15 and is a direction substantially perpendicular to the central axis C and away from the central axis C in a radial direction. The θ direction is a circumferential direction with respect to the central axis of the rotor shaft 15 and is a direction of rotation around the central axis C while maintaining a constant distance from the central axis C.

FIG. 1 is a cross-sectional view showing a configuration of the electric motor 1.

FIG. 1 is a cross-sectional view of the electric motor 1 taken along line F1-F1 in FIG. 3 to be described below. As shown in FIG. 1, the electric motor 1 includes a frame 11, a bearing bracket 12, a stator core 13, a rotor core 14, and the rotor shaft 15.

The frame 11 is an outer shell member which forms at least a portion of an outer shell of the electric motor 1. The frame 11 forms an example of a "case 10" together with the bearing bracket 12 to be described below. The case 10 accommodates the stator core 13 and the rotor core 14. Further, the phrase "accommodating the stator core and the rotor core" in the present application includes a case in which at least a portion of the stator core and at least a portion of the rotor core are exposed to the outside of the case 10.

Specifically, the frame 11 includes a peripheral wall 21 and an end wall 22.

The peripheral wall 21 is formed in a tubular shape (for example, a cylindrical shape) with the central axis C as a center. Further, the term "tubular shape" as used in the present application is not limited to a cylindrical shape but also includes a polygonal tubular shape. The term "tubular shape" as used in the present application may be referred to as a "hollow shape," an "annular shape," or the like. As a pair of ends in the axial direction of the central axis C, the peripheral wall 21 includes a first end 21a on the −Z direction side and a second end 21b on the +Z direction side.

The end wall 22 is provided from the first end 21a of the peripheral wall 21 toward an inner side in the R direction of the central axis C. That is, the end wall 22 is provided in a direction intersecting (for example, substantially perpendicular to) the peripheral wall 21. The end wall 22 has a circular outer shape and is connected to the peripheral wall 21 in the entire circumference in the θ direction. At a center of the end wall 22, a circular first opening 22a is provided. The first opening 22a penetrates through the end wall 22 in the +Z direction.

The bearing bracket 12 is an outer shell member which forms another portion of the outer shell of the electric motor 1. The bearing bracket 12 is positioned on a side opposite to the end wall 22 with respect to the peripheral wall 21 and is attached to the second end 21b of the peripheral wall 21. The bearing bracket 12 is provided from the second end 21b of the peripheral wall 21 toward an inner side in the R direction of the central axis C. That is, the bearing bracket 12 is provided in a direction intersecting (for example, substantially perpendicular to) the peripheral wall 21. The bearing bracket 12 has a circular outer shape and is connected to the peripheral wall 21 in the entire circumference in the θ direction. At a center of the bearing bracket 12, a circular second opening 12a is provided. The second opening 12a penetrates through the bearing bracket 12 in the −Z direction.

The stator core 13 is formed in a tubular shape (for example, a cylindrical shape). The stator core 13 is held on an inner peripheral surface of the peripheral wall 21 of the frame 11. Specifically, a pair of stator core pressers 24a and 24b are provided on the inner peripheral surface of the peripheral wall 21 of the frame 11. The pair of stator core pressers 24a and 24b are disposed separately on opposite sides of the stator core 13 in the +Z direction. The stator core 13 is fixed to the peripheral wall 21 of the frame 11 by being sandwiched between the pair of stator core pressers 24a and 24b. A plurality of grooves in the +Z direction are provided in the stator core 13. In the grooves, a coil 25 is accommodated.

The rotor core 14 and the rotor shaft 15 are rotatably disposed on an inner peripheral side of the stator core 13. The rotor shaft 15 is fixed to the rotor core 14 so that the rotor shaft 15 is supported. A pair of rotor core pressers 26a and 26b are attached to the rotor shaft 15. The pair of rotor core pressers 26a and 26b are separately disposed on opposite sides of the rotor core 14 in the +Z direction. The rotor core 14 is fixed to the rotor shaft 15 by being sandwiched between the pair of rotor core pressers 26a and 26b.

The rotor shaft 15 includes a first end 15a on the −Z direction side and a second end 15b on the +Z direction side. The first end 15a passes through the first opening 22a of the end wall 22 of the frame 11. The second end 15b is a driving side end to which a joint for taking out a rotational force of the electric motor 1 is attached. The second end 15b passes through the second opening 12a of the bearing bracket 12 and protrudes toward the outside of the electric motor 1.

As shown in FIG. 1, a first partition plate 27a and a second partition plate 27b are attached to the rotor shaft 15. The first partition plate 27a is provided between the end wall 22 of the frame 11 and the rotor core 14. The second partition plate 27b is provided between the bearing bracket 12 and the rotor core 14.

A first partition 28a which faces the first partition plate 27a is provided on the end wall 22. The first partition 28a protrudes from an inner surface of the end wall 22 toward the first partition plate 27a. Similarly, a second partition 28b which faces the second partition plate 27b is provided on the bearing bracket 12. The second partition 28b protrudes from an inner surface of the bearing bracket 12 toward the second partition plate 27b.

As shown in FIG. 1, a first labyrinth 29a for blocking a flow of air is formed between the first partition plate 27a and the first partition 28a. Similarly, a second labyrinth 29b for blocking a flow of air is formed between the second partition plate 27b and the second partition 28b.

The first labyrinth 29a and the second labyrinth 29b partition an internal space of the electric motor 1 into a space S1 into which outside air can be introduced through an air intake port 49 (see FIG. 3) to be described below and a space S2 substantially blocked from outside air and accommodating important parts (for example, the coil 25). The first partition plate 27a and the second partition plate 27b also have a function of dissipating some of heat generated by parts accommodated in the space S2 by being in contact with air introduced into the space S1 from the outside.

Next, a configuration for supporting the first end 15a of the rotor shaft 15 will be described.

As shown in FIG. 1, as a configuration for supporting the first end 15a of the rotor shaft 15, the electric motor 1 includes a first bearing 31, a first housing 32, a first rotor supporter 33, and a first support member receiver 34. In the description below, the first bearing 31 and the first housing 32 are collectively referred to as a "first bearing part 35" in some cases.

The first end 15a of the rotor shaft 15 passes through an inner circumferential side of the first bearing 31. The first bearing 31 rotatably supports the first end 15a of the rotor shaft 15. As shown in FIG. 1, at least a portion of the first bearing 31 is disposed on an inner peripheral side of the first opening 22a of the end wall 22 of the frame 11.

The first housing 32 includes a holder 32a which holds the first bearing 31 and a flange 32b for fixing the first housing 32 to the frame 11. The "flange" as used in the present application is not limited to a member formed in a circular shape, and may be a member formed in a fan shape or other shape.

In the present embodiment, the holder 32a is formed in a cylindrical shape which surrounds an outer peripheral side of the first bearing 31. The holder 32a is fitted to the first bearing 31 to hold the first bearing 31. At least a portion of the holder 32a is inserted into the first opening 22a of the end wall 22 of the frame 11. The holder 32a is in contact with an inner circumferential surface of the first opening 22a in the R direction of the central axis C. That is, the holder 32a is sandwiched between the end wall 22 of the frame 11 and the first bearing 31 in the R direction of the central axis C. The holder 32a supports the first bearing 31 with respect to the end wall 22 of the frame 11 by being sandwiched between the end wall 22 of the frame 11 and the first bearing 31.

The flange 32b is provided at an end of the holder 32a. Specifically, the holder 32a of the first housing 32 has an end protruding from the first opening 22a to the outside of the frame 11. The flange 32b protrudes from the end of the holder 32a in the R direction of the central axis C. The flange 32b faces the end wall 22 of the frame 11 from the outside of the frame 11 (that is, from the outside of the electric motor) in the +Z direction.

Next, the first rotor supporter 33 will be described.

The first rotor supporter 33 is a member for fixing the rotor shaft 15 and the rotor core 14 to the frame 11 when the first bearing part 35 is removed from the rotor shaft 15. As shown in FIG. 1, the first rotor supporter 33 is accommodated between the end wall 22 of the frame 11 and the rotor core 14. The first rotor supporter 33 includes a base 33a, an extender 33b, and a fixer 33c.

The base (fitting portion) 33a is formed in a tubular shape (for example, a cylindrical shape) which surrounds an outer peripheral side of the holder 32a of the first housing 32. The base 33a is disposed along the inner surface on the +Z direction side of the end wall 22 of the frame 11. The base 33a faces the end wall 22 of the frame 11 from a side opposite to the flange 32b of the first housing 32.

As shown in FIG. 1, a first support 36 is provided on the inner surface of the end wall 22 of the frame 11. The first support 36 is formed in an annular shape (for example, an annular shape) protruding in the +Z direction from the inner surface of the end wall 22 and surrounding an outer peripheral side of the base 33a. The first support 36 has an inner peripheral surface 36a which is in contact with the base 33a from a side opposite to the rotor shaft 15. The inner peripheral surface 36a of the first support 36 is formed substantially parallel to the central axis C. The base 33a is fitted to the inner peripheral surface 36a of the first support 36. The first support 36 supports the first rotor supporter 33 from an outer peripheral side thereof in the R direction of the central axis C.

The first support 36 covers at least an end on the end wall 22 side of the base 33a over the entire circumference in the θ direction with respect to the central axis C. Specifically, the first rotor supporter 33 has a first surface 37 which faces the inner surface of the end wall 22 in the −Z direction (see FIG. 5). The inner surface of the end wall 22 has a second surface 38 facing the first surface 37 of the first rotor supporter 33 in the +Z direction (see FIG. 5). The inner peripheral surface 36a of the first support 36 covers the first surface 37 of the first rotor supporter 33, the second surface 38 of the end wall 22, and a gap Sa2 between the first surface 37 and the second surface 38 without a break over the entire circumference in the θ direction with respect to the central axis C when viewed from the outside in the R direction of the central axis C.

As shown in FIG. 1, the extender 33b obliquely extends with respect to the central axis C from the base 33a toward the rotor shaft 15. That is, the extender 33b is formed in a tubular shape in which an outer diameter and an inner diameter become smaller toward the rotor core 14.

The fixer 33c is provided at a distal end of the extender 33b. The fixer 33c is formed in a tubular shape which surrounds an outer circumferential side of the rotor shaft 15. The fixer 33c has a first inclined portion 33ca. The first inclined portion 33ca is an annular inclined portion (for example, an inclined surface) inclined with respect to the central axis C. The first inclined portion 33ca is inclined in a direction away from the rotor shaft 15 toward the rotor core 14. For example, the first inclined portion 33ca may be inclined by approximately 45 degrees with respect to the central axis C.

In the first rotor supporter 33 described above, the base 33a, the extender 33b, and the fixer 33c are integrally formed. The first rotor supporter 33 is movable in the +Z direction with respect to the frame 11 at the time of an operation of disassembling the electric motor 1 to be described below. Specifically, the first rotor supporter 33 is guided by the inner peripheral surface 36a of the first support 36 and is slidable in a direction approaching the rotor core 14. As shown in FIG. 1, the first rotor supporter 33 has a gap Sa0 between the first rotor supporter 33 and the rotor core 14 which allows the first rotor supporter 33 to move toward the rotor core 14.

Next, the first support member receiver 34 will be described.

The first support member receiver 34 includes an attachment 34a fixed to the rotor shaft 15 and a receiving portion 34b receiving the first rotor supporter 33.

The attachment 34a is formed in a tubular shape having an inner diameter substantially matching an outer diameter of the rotor shaft 15. For example, the attachment 34a is fitted and fixed to the rotor shaft 15. Further, the first support member receiver 34 may be attached to the rotor core 14 instead of or in addition to the rotor shaft 15.

The receiving portion 34b is a flange which protrudes from the attachment 34a in the R direction of the central axis C. The receiving portion 34b is annularly formed on the outer circumferential side of the rotor shaft 15. The first rotor supporter 33 can come in contact with or be separated from the receiving portion 34b. That is, when the first rotor supporter 33 moves toward the rotor core 14 at the time of the operation of disassembling the electric motor 1, the receiving portion 34b receives the fixer 33c of the first rotor supporter 33. When the first rotor supporter 33 comes into contact with the first support member receiver 34, the first support member receiver 34 can fix the rotor shaft 15 and the rotor core 14 to the first rotor supporter 33.

Specifically, the receiving portion 34b has a second inclined portion 34ba. The second inclined portion 34ba is an annular inclined portion (for example, an inclined surface) formed substantially parallel to the first inclined portion 33ca. For example, the second inclined portion 34ba may be inclined by approximately 45 degrees with respect to the central axis C. The receiving portion 34b is disposed between the first inclined portion 33ca and the rotor core 14. In other words, the second inclined portion 34ba faces the first inclined portion 33ca from the same side as the rotor core 14. A very small gap Sa1 is provided between the second inclined portion 34ba and the first inclined portion 33ca.

Next, screw holes and through holes provided in the first housing 32, the end wall 22 of the frame 11, and the first rotor supporter 33 will be described.

As shown in FIG. 1, a first screw hole 41 is provided in the flange 32b of the first housing 32. The first screw hole 41 penetrates through the flange 32b of the first housing 32 in the +Z direction. An inner circumferential surface of the first screw hole 41 has a screw thread.

A first through hole 42 is provided in the end wall 22 of the frame 11. The first through hole 42 penetrates through the end wall 22 of the frame 11 in the +Z direction. The first through hole 42 is a simple hole having no thread. An inner diameter of the first through hole 42 is slightly larger than an inner diameter of the first screw hole 41. The first housing 32 is attached to the frame 11 so that the first screw hole 41 is aligned with the first through hole 42 of the end wall 22.

The base 33a of the first rotor supporter 33 includes a contact receiver 43. The contact receiver 43 is disposed to face the first through hole 42 of the end wall 22. The contact receiver 43 can come into contact with the boll which has been screwed into the first screw hole 41 and passed through the first through hole 42. The contact receiver 43 is, for example, a vertical surface perpendicular to the central axis C. Alternatively, the contact receiver 43 may be an inclined surface in a direction intersecting the central axis C, or may have a groove or the like.

Figure 2:
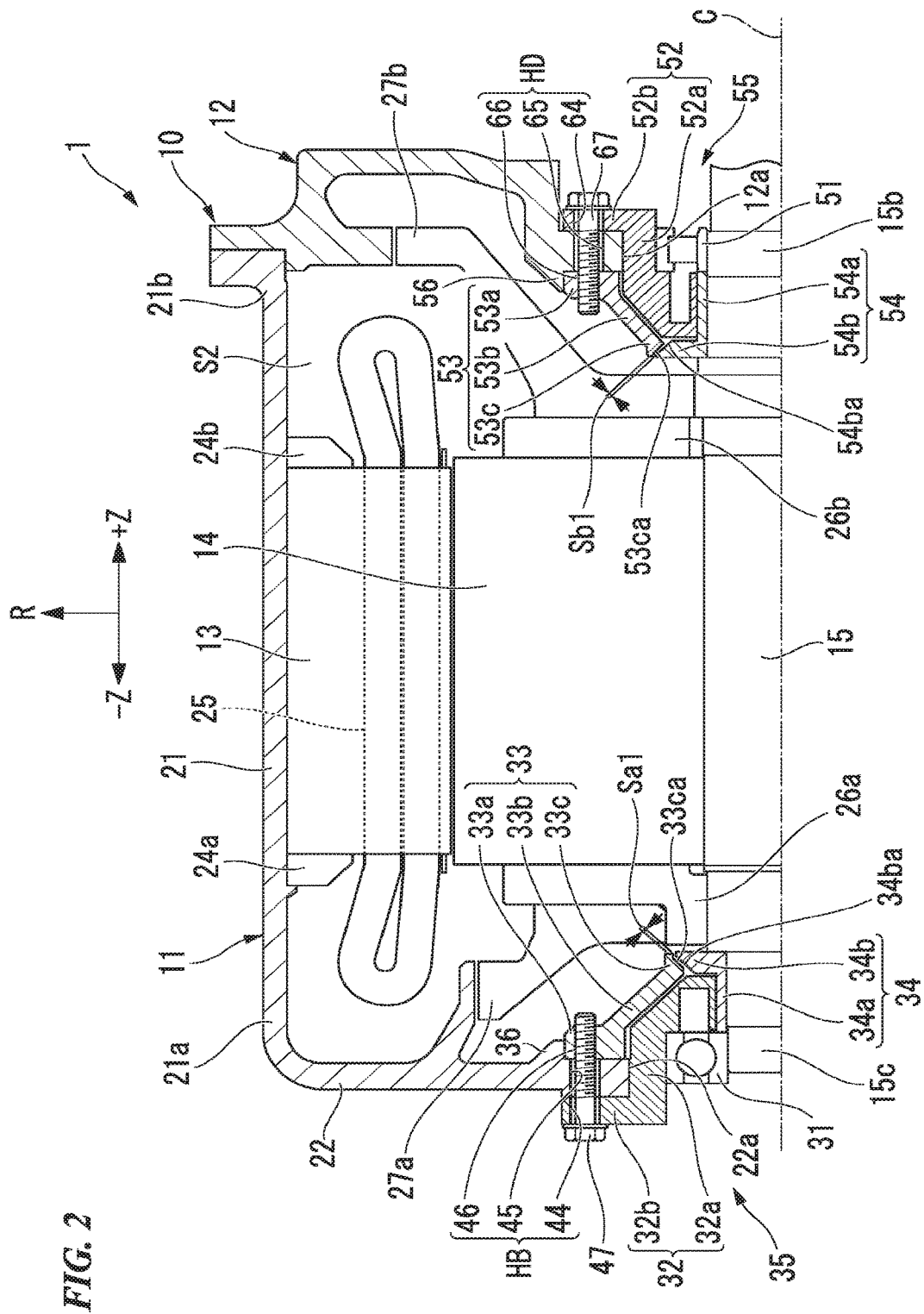
FIG. 2 is a cross-sectional view showing a cross section different from that of FIG. 1 of the electric motor shown in FIG. 1.

FIG. 2 is a cross-sectional view of the electric motor 1 taken along line F2-F2 in FIG. 3 to be described below.

As shown in FIG. 2, a second through hole 44 is provided in the flange 32b of the first housing 32. The second through hole 44 penetrates through the flange 32b in the +Z direction. The second through hole 44 is a simple hole having no thread. An inner diameter of the second through hole 44 is slightly larger than an inner diameter of a second screw hole 46 to be described below.

A third through hole 45 is provided in the end wall 22 of the frame 11. The third through hole 45 penetrates through the end wall 22 of the frame 11 in the +Z direction. The third through hole 45 is a simple hole having no thread. An inner diameter of the third through hole 45 is slightly larger than an inner diameter of the second screw hole 46 to be described below. The first housing 32 is attached to the frame 11 so that the second through hole 44 is aligned with the third through hole 45 of the end wall 22.

The second screw hole 46 is provided in the base 33a of the first rotor supporter 33. The second screw hole 46 penetrates through the base 33a of the first rotor supporter 33 in the +Z direction. An inner circumferential surface of the second screw hole 46 has a screw thread. The second screw hole 46 is disposed to face the third through hole 45 of the end wall 22.

As shown in FIG. 2, a first fixing bolt 47 is inserted into the second through hole 44 of the first housing 32 from the outside of the frame 11. The first fixing bolt 47 passes through the second through hole 44 and the third through hole 45 and is screwed into the second screw hole 46. When the first fixing bolt 47 is screwed into the second screw hole 46, the first housing 32 and the first rotor supporter 33 are fixed to the end wall 22 of the frame 11. That is, the first fixing bolt 47 fastens the first housing 32, the end wall 22 of the frame 11, and the first rotor supporter 33 together.

Figure 3:
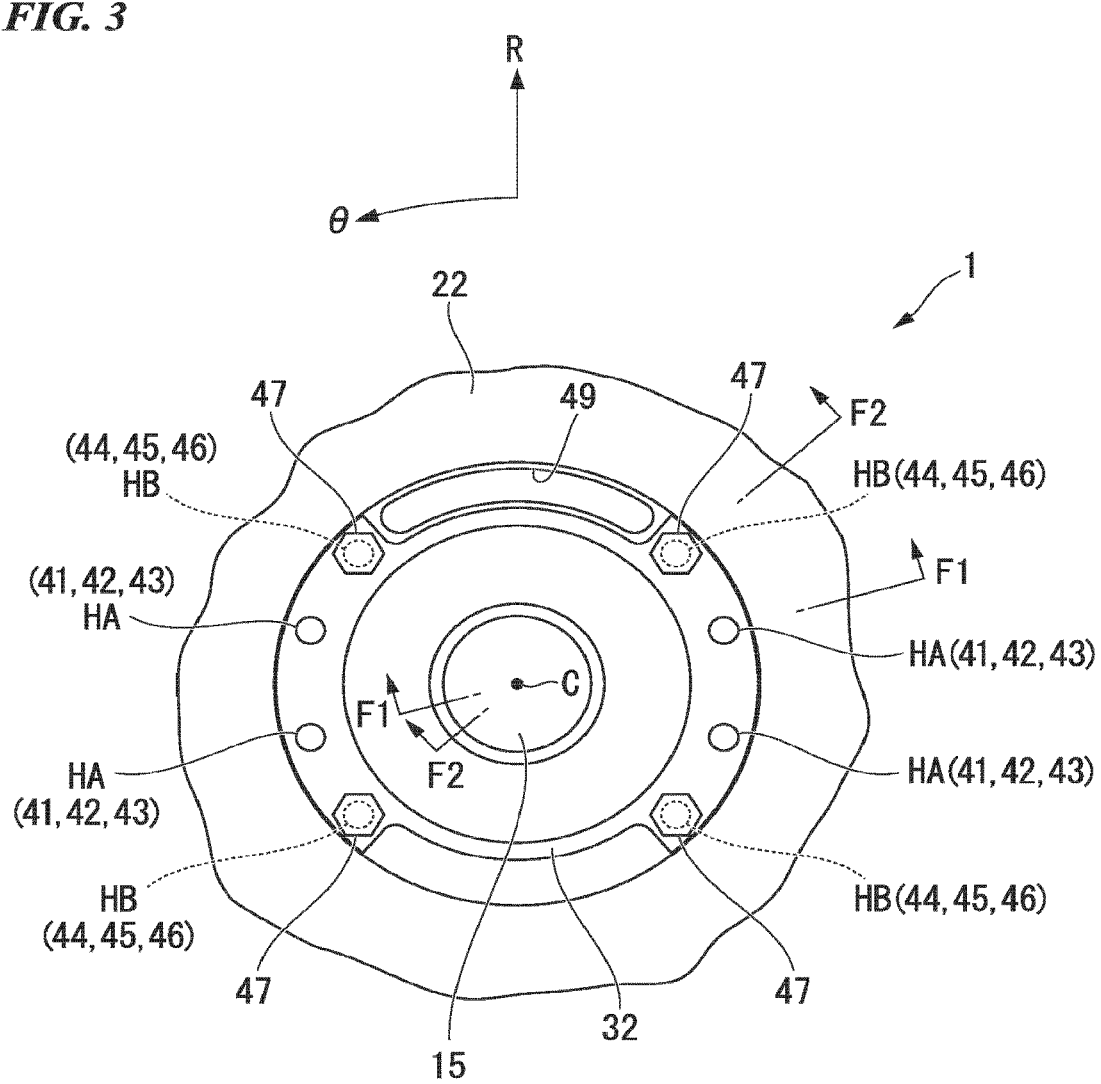
FIG. 3 is a front view showing an end wall of a frame of the electric motor shown in FIG. 1.

FIG. 3 is a front view showing the end wall 22 of the frame 11.

Here, for convenience of description, the first screw hole 41, the first through hole 42, and the contact receiver 43 are collectively referred to as a "hole set HA." On the other hand, the second through hole 44, the third through hole 45, and the second screw hole 46 are collectively referred to as a "hole set IIB."

As shown in FIG. 3, the hole set HA and the hole set HB are provided at a plurality of positions. The electric motor 1 of the present embodiment includes four hole sets HA and four hole sets HB. For example, the four hole sets HB may be dispersedly disposed at substantially equal angular intervals in the θ direction with respect to the central axis C. On the other hand, two hole sets HA may be collectively disposed between the two hole sets HB in the θ direction with respect to the central axis C. In addition, the other two hole sets HA may be collectively disposed between the other two hole sets HB in the θ direction with respect to the central axis C. In other words, a plurality of hole sets HA are collectively disposed in specific regions with respect to a plurality of hole sets HB.

In other words, since the plurality of hole sets HA are disposed in specific regions, the plurality of hole sets HB are dispersedly disposed at substantially equal angular intervals in the θ direction with respect to the central axis C as described above. Each of the hole sets HB includes the first fixing bolt 47 which fixes the frame 11, the first housing 32, and the first rotor supporter 33. Therefore, when the plurality of hole sets HB are dispersedly disposed at substantially equal angular intervals in the θ direction with respect to the central axis C, fixing strengths of the frame 11, the first housing 32, and the first rotor supporter 33 tend to be high.

As shown in FIG. 3, the air intake port 49 is provided between the two hole sets HB in the θ direction with respect to the central axis C. The air intake port 49 penetrates through the end wall 22 of the frame 11 and is open to the space S1 inside the electric motor 1. Since outside air is introduced into the space S1 in the electric motor 1 through the air intake port 49, heat dissipation of the electric motor 1 is promoted.

Next, a configuration for supporting the second end 15b of the rotor shaft 15 will be described.

As shown in FIG. 1, as a configuration for supporting the second end 15b of the rotor shaft 15, the electric motor 1 includes a second bearing 51, a second housing 52, a second rotor supporter 53, and a second support member receiver 54. In the description below, the second bearing 51 and the second housing 52 may be collectively referred to as a "second bearing part 55" in some cases.

The second end 15b of the rotor shaft 15 passes through an inner circumferential side of the second bearing 51. The second bearing 51 rotatably supports the second end 15b of the rotor shaft 15. As shown in FIG. 1, at least a portion of the second bearing 51 is disposed on an inner peripheral side of the second opening 12a of the bearing bracket 12.

The second housing 52 includes a holder 52a which holds the second bearing 51 and a flange 52b for fixing the second housing 52 to the bearing bracket 12.

In the present embodiment, the holder 52a is formed in a cylindrical shape which surrounds an outer peripheral side of the second bearing 51. The holder 52a is filled to the second bearing 51 to hold the second bearing 51. At least a portion of the holder 52a is inserted into the second opening 12a of the bearing bracket 12. The holder 52a is in contact with an inner circumferential surface of the second opening 12a in the R direction of the central axis C. That is, the holder 52a is sandwiched between the bearing bracket 12 and the second bearing 51 in the R direction of the central axis C. The holder 52a supports the second bearing 51 with respect to the bearing bracket 12 by being sandwiched between the bearing bracket 12 and the second bearing 51.

The flange 52b is provided at an end of the holder 52a. Specifically, the holder 52a of the second housing 52 has an end protruding from the second opening 12a to the outside of the bearing bracket 12. The flange 52b protrudes from the end of the holder 52a in the R direction of the central axis C. The flange 52b faces the bearing bracket 12 from the outside of the bearing bracket 12 (that is, from the outside of the electric motor) in the −Z direction.

Next, the second rotor supporter 53 will be described.

The second rotor supporter 53 is a member which fixes the rotor shaft 15 and the rotor core 14 to the bearing bracket 12 when the second bearing part 55 is removed from the rotor shaft 15. As shown in FIG. 1, the second rotor supporter 53 is accommodated between the bearing bracket 12 and the rotor core 14. The second rotor supporter 53 includes a base 53a, an extender 53b, and a fixer 53c.

The base (fitter) 53a is formed in a tubular shape (for example, a cylindrical shape) which surrounds an outer peripheral side of the holder 52a of the second housing 52. The base 53a is disposed along the inner surface of the bearing bracket 12 on the −Z direction side. The base 53a faces the bearing bracket 12 from a side opposite to the flange 52b of the second housing 52.

As shown in FIG. 1, a second support 56 is provided on the inner surface of the bearing bracket 12. The second support 56 is formed in an annular shape (for example, an annular shape) protruding from the inner surface of the bearing bracket 12 in the −Z direction and surrounding an outer peripheral side of the base 53a. The second support 56 has an inner peripheral surface 56a which is in contact with the base 53a from a side opposite to the rotor shaft 15. The inner peripheral surface 56a of the second support 56 is formed substantially parallel to the central axis C. The base 53a is fitted to the inner peripheral surface 56a of the second support 56. The second support 56 supports the second rotor supporter 53 from an outer peripheral side in the R direction with respect to the central axis C.

The second support 56 covers at least an end on the bearing bracket 12 side of the base 53a over the entire circumference in the θ direction with respect to the central axis C. Specifically, the second rotor supporter 53 has a first surface 57 which faces the inner surface of the bearing bracket 12 in the +Z direction (see FIG. 5). The inner surface of the bearing bracket has a second surface 58 which faces the first surface 57 of the second rotor supporter 53 in the −Z direction (see FIG. 5). When viewed from the outside in the R direction of the central axis C, the inner peripheral surface 56a of the second support 56 covers the first surface 57 of the second rotor supporter 53, the second surface 58 of the bearing bracket 12, and a gap Sb2 between the first surface 57 and the second surface 58 without a break over the entire circumference in the θ direction with respect to the central axis C.

As shown in FIG. 1, the extender 53b obliquely extends with respect to the central axis C from the base 53a toward the rotor shaft 15. The extender 53b is formed in a tubular shape in which an outer diameter and an inner diameter become smaller toward the rotor core 14.

The fixer 53c is provided at a distal end of the extender 53b. The fixer 53c is formed in a tubular shape which surrounds the outer peripheral side of the rotor shaft 15. The fixer 53c has a third inclined portion 53ca. The third inclined portion 53ca is an annular inclined portion (for example, an inclined surface) inclined with respect to the central axis C. The third inclined portion 53ca is inclined in a direction away from the rotor shaft 15 toward the rotor core 14. For example, the third inclined portion 53ca is inclined by approximately 45 degrees with respect to the central axis C.

In the second rotor supporter 53 described above, the base 53a, the extender 53b, and the fixer 53c are integrally formed. The second rotor supporter 53 is movable in the −Z direction with respect to the bearing bracket 12 at the time of the operation of disassembling the electric motor 1 to be described below. Specifically, the second rotor supporter 53 is guided by the inner peripheral surface 56a of the second support 56 and is slidable in a direction approaching the rotor core 14. As shown in FIG. 1, the second rotor supporter 53 has a gap Sb0 between the second rotor supporter 53 and the rotor core 14 which allows the second rotor supporter 53 to move toward the rotor core 14.

Next, the second support member receiver 54 will be described.

The second support member receiver 54 includes an attachment 54a fixed to the rotor shaft 15 and a receiving portion 54b receiving the second rotor supporter 53.

The attachment 54a is formed in a tubular shape having an inner diameter substantially matching the outer diameter of the rotor shaft 15. For example, the attachment 54a is fitted and fixed to the rotor shaft 15. Further, the second support member receiver 54 may be attached to the rotor core 14 instead of or in addition to the rotor shaft 15.

The receiving portion 54b is a flange which protrudes from the attachment 54a in the R direction of the central axis C. The receiving portion 54b is annularly formed on the outer peripheral side of the rotor shaft 15. The second rotor supporter 53 can be in contact with or separated from the receiving portion 54b. That is, when the second rotor supporter 53 moves toward the rotor core 14 at the time of the operation of disassembling the electric motor 1, the receiving portion 54b receives the fixer 53c of the second rotor supporter 53. When the second rotor supporter 53 comes into contact with the second support member receiver 54, the second support member receiver 54 can fix the rotor shaft 15 and the rotor core 14 to the second rotor supporter 53.

Specifically, the receiving portion 54b has a fourth inclined portion 54ba. The fourth inclined portion 54ba is an annular inclined portion (for example, an inclined surface) formed substantially parallel to the third inclined portion 53ca. For example, the fourth inclined portion 54ba is inclined by approximately 45 degrees with respect to the central axis C. The receiving portion 54b is disposed between the third inclined portion 53ca and the rotor core 14. In other words, the fourth inclined portion 54ba faces the third inclined portion 53ca from the same side as the rotor core 14. A very small gap Sb1 is provided between the fourth inclined portion 54ba and the third inclined portion 53ca.

Next, screw holes and through holes provided in the second housing 52, the bearing bracket 12, and the second rotor supporter 53 will be described.

As shown in FIG. 1, a third screw hole 61 is provided in the flange 52b of the second housing 52. The third screw hole 61 penetrates through the flange 52b of the second housing 52 in the −Z direction. An inner circumferential surface of the third screw hole 61 has a screw thread.

A fourth through hole 62 is provided in the bearing bracket 12. The fourth through hole 62 penetrates through the bearing bracket 12 in the −Z direction. The fourth through hole 62 is a simple hole having no thread. An inner diameter of the fourth through hole 62 is slightly larger than an inner diameter of the third screw hole 61. The second housing 52 is attached to the bearing bracket 12 so that the third screw hole 61 is aligned with the fourth through hole 62 of the bearing bracket 12.

The base 53a of the second rotor supporter 53 includes a contact receiver 63. The contact receiver 63 is disposed to face the fourth through hole 62 of the bearing bracket 12. The contact receiver 63 can come into contact with the bolt that has been screwed into the third screw hole 61 and passed through the fourth through hole 62. The contact receiver 63 is, for example, a vertical surface perpendicular to the axial direction of the central axis C. Alternatively, the contact receiver 63 may be an inclined surface in a direction intersecting the central axis C, or may have a groove or the like.

As shown in FIG. 2, a fifth through hole 64 is provided in the flange 52b of the second housing 52. The fifth through hole 64 penetrates through the flange 52*b* in the −Z direction. The fifth through hole 64 is a simple hole having no thread. An inner diameter of the fifth through hole 64 is slightly larger than an inner diameter of a fourth screw hole 66 to be described below A sixth through hole 65 is provided in the bearing bracket 12. The sixth through hole 65 penetrates through the bearing bracket 12 in the −Z direction. The sixth through hole 65 is a simple hole having no thread. An inner diameter of the sixth through hole 65 is slightly larger than an inner diameter of the fourth screw hole 66 to be described below. The second housing 52 is attached to the bearing bracket 12 so that the fifth through hole 64 is aligned with the sixth through hole 65 of the bearing bracket 12.

The fourth screw hole 66 is provided in the base 53*a* of the second rotor supporter 53. The fourth screw hole 66 penetrates through the base 53*a* of the second rotor supporter 53 in the −Z direction. An inner circumferential surface of the fourth screw hole 66 has a screw thread. The fourth screw hole 66 is disposed to face the sixth through hole 65 of the bearing bracket 12.

As shown in FIG. 2, a second fixing bolt 67 is inserted into the second through hole 44 from the outside of the bearing bracket 12. The second fixing bolt 67 passes through the fifth through hole 64 and the sixth through hole 65 and is screwed into the fourth screw hole 66. When the second fixing bolt 67 is screwed into the fourth screw hole 66, the second housing 52 and the second rotor supporter 53 are fixed to the bearing bracket 12. That is, the second fixing bolt 67 fastens the second housing 52, the bearing bracket 12, and the second rotor supporter 53 together.

Here, for convenience of description, the third screw hole 61, the fourth through hole 62, and the contact receiver 63 are collectively referred to as a "hole set HC." On the other hand, the fifth through hole 64, the sixth through hole 65, and the fourth screw hole 66 are collectively referred to as a "hole set HD."

The hole set HC and the hole set HD are provided at a plurality of positions as in the hole set HA and the hole set HB. The electric motor 1 of the present embodiment has four hole sets HC and four hole sets HD. The four hole sets HC are disposed at approximately the same positions as the four hole sets HA with respect to the central axis C. The four hole sets HD are disposed at approximately the same positions as the four hole sets HB with respect to the central axis C.

Further, between the two hole sets HD, an air intake port 49 similar to the air intake port 49 shown in FIG. 3 is provided. The air intake port 49 penetrates through the bearing bracket 12 and is open to the space S1 inside the electric motor 1. Since outside air is introduced into the space S1 in the electric motor 1 through the air intake port 49, heat dissipation of the electric motor 1 is promoted.

Next, a method of disassembling for removing the first bearing part 35 and the second bearing part 55 from the rotor shaft 15 will be described with reference to FIGS. 4 and 5. In the present embodiment, the first bearing part 35 and the second bearing part 55 are removed from the rotor shaft 15 without pulling out the rotor core 14 from the stator core 13. Here, first, a method of removing the first bearing part 35 from the rotor shaft 15 will be described.

As a premise, the first bearing part 35 and the first rotor supporter 33 are fixed to the end wall 22 of the frame 11 using the first fixing bolt 47 (see FIG. 2) in a state in which the electric motor 1 is mounted on a truck. Therefore, at the time of the operation of disassembling the electric motor 1, the first fixing bolt 47 is removed before performing an operation of removing the first bearing part 35 from the rotor shaft 15. The first fixing bolt 47 is removed from the first housing 32, the end wall 22 of the frame 11, and the first rotor supporter 33 by being rotated in a loosening direction.

Figure 4:
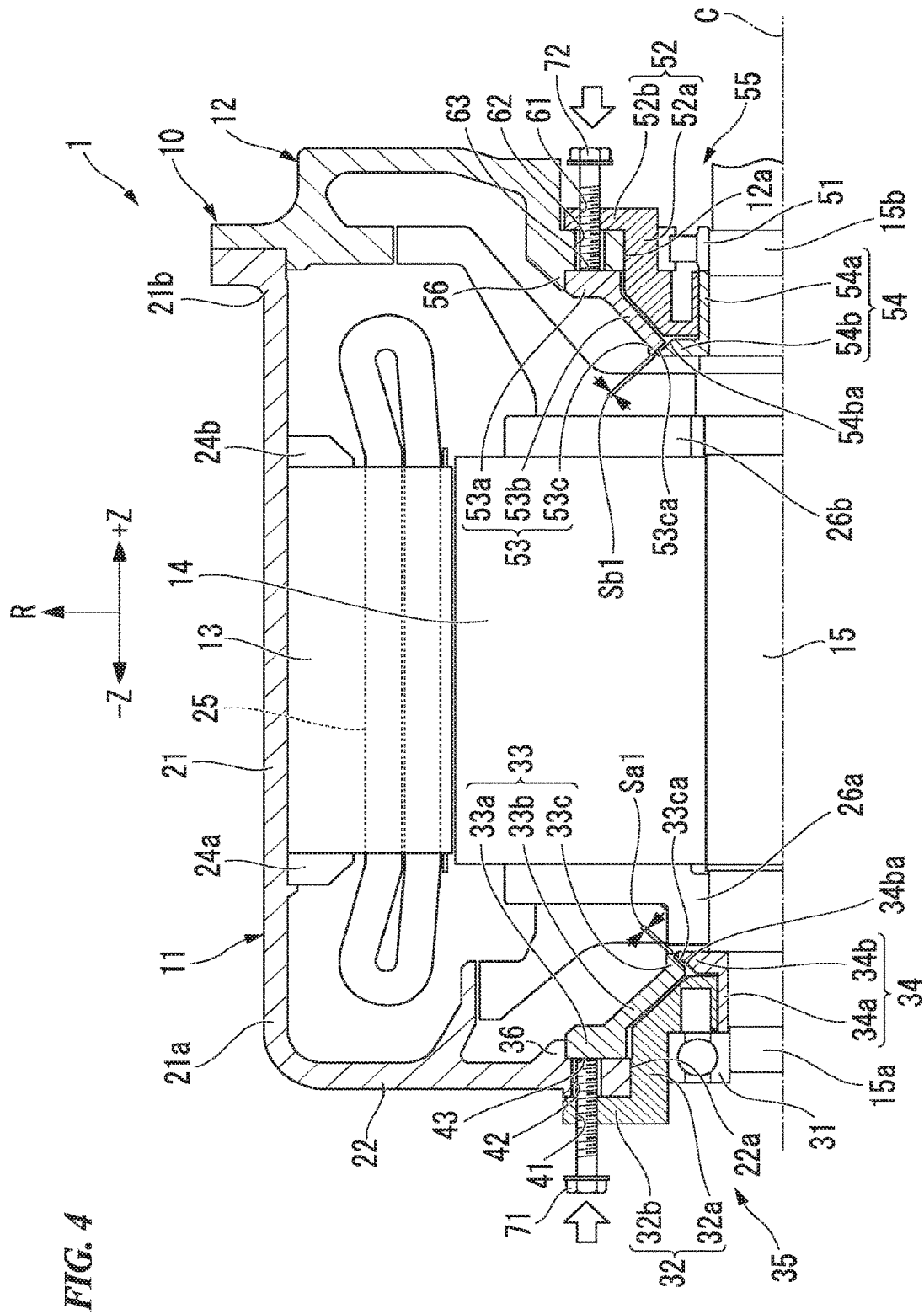
FIG. 4 is a cross-sectional view showing a first stage of an operation of disassembling the electric motor shown in FIG. 1.

FIG. 4 shows a first stage of an operation of removing the first bearing part 35.

As shown in FIG. 4, in the operation of removing the first bearing part 35, first, a first removing bolt 71 is screwed into the first screw hole 41 of the first housing 32. Specifically, the first removing bolt 71 is screwed from the outside of the frame 11 with respect to the first screw hole 41 of the first housing 32. The first removing bolt 71 screwed into the first screw hole 41 advances toward the inside (+Z direction side) of the frame 11 by being rotated in a tightening direction, passes through the first through hole 42 of the end wall 22 of the frame 11, and is pressed against the contact receiver 43 of the first rotor supporter 33.

The first removing bolt 71 is further rotated in a tightening direction in a state in which a distal end of the first removing bolt 71 is pressed against the contact receiver 43 of the first rotor supporter 33. As the first removing bolt 71 rotates in the tightening direction, the first removing bolt 71 advances toward the inside of the frame 11 and pushes the first rotor supporter 33 to move it toward the rotor core 14.

The first rotor supporter 33 is pushed by the first removing bolt 71 and moved toward the rotor core 14 so that the first inclined portion 33*ca* of the first rotor supporter 33 is pressed against the second inclined portion 34*ba* of the first support member receiver 34.

When the first inclined portion 33*ca* of the first rotor supporter 33 is pressed against the second inclined portion 34*ba* of the first support member receiver 34, a position of the rotor shaft 15 with respect to the frame 11 is fixed. When the position of the rotor shaft 15 with respect to the frame 11 is fixed, even if the first bearing part 35 is removed from the rotor shaft 15, the rotor core 14 does not fall out from the stator core 13.

Figure 5:
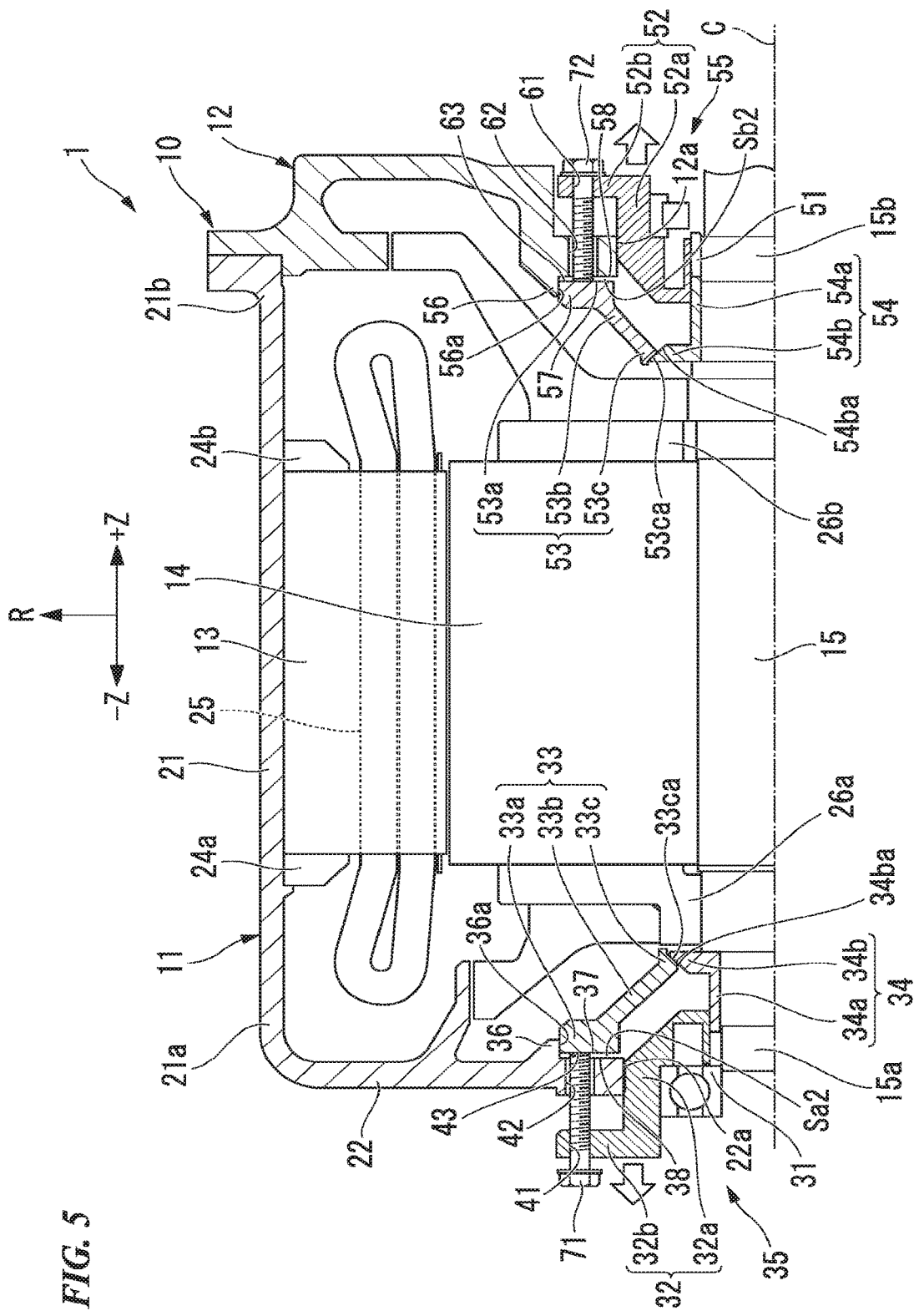
FIG. 5 is a cross-sectional view showing a second stage of the operation of disassembling the electric motor shown in FIG. 1.

FIG. 5 shows a second stage of the operation of removing the first bearing part 35.

As shown in FIG. 5, the first bearing part 35 is removed from the rotor shaft 15 in a state in which the position of the rotor shaft 15 with respect to the frame 11 is fixed. Specifically, in a state in which the first inclined portion 33*ca* of the first rotor supporter 33 is pressed against the second inclined portion 34*ba* of the first support member receiver 34, the first removing bolt 71 is further rotated in the tightening direction. However, the first rotor supporter 33 is pressed against the first support member receiver 34 and cannot move toward the rotor core 14. Therefore, when the first removing bolt 71 is further rotated in the tightening direction, due to a reaction force received by the first removing bolt 71 from the first rotor supporter 33, the first bearing part 35 moves to the outside of the frame 11. As a result, the first bearing part 35 is removed from the rotor shaft 15. When the first bearing part 35 is removed from the rotor shaft 15, maintenance and replacement of the first bearing 31 becomes possible. Further, when the first housing 32 is removed from the frame 11, the first removing bolt 71 is removed from the frame 11 together with the first bearing part 35.

Also, when the first rotor supporter 33 moves toward the rotor core 14, the gap Sa2 is generated between the inner surface of the end wall 22 and the first rotor supporter 33. The gap Sa2 is covered by the first support 36 from the outer peripheral side in the R direction of the central axis C without any break in the θ direction with respect to the central axis C.

Next, a method of removing the second bearing part 55 from the rotor shaft 15 will be described with reference to FIGS. 4 and 5. As a premise, the second bearing part 55 and the second rotor supporter 53 are fixed to the bearing bracket 12 by the second fixing bolt 67 (see FIG. 2) in a state in which the electric motor 1 is mounted on a truck. Therefore, at the time of the operation of disassembling the electric motor 1, the second fixing bolt 67 is removed before performing an operation of removing the second bearing 51 from the rotor shaft 15. The second fixing bolt 67 is removed from the second housing 52, the bearing bracket 12, and the second rotor supporter 53 by being rotated in a loosening direction.

FIG. 4 shows a first stage of an operation of removing the second bearing part 55.

As shown in FIG. 4, in the operation of removing the second bearing part 55, first, a second removing bolt 72 is screwed into the third screw hole 61 of the second housing 52. Specifically, the second removing bolt 72 is screwed from the outside of the bearing bracket 12 with respect to the third screw hole 61 of the second housing 52. The second removing bolt 72 screwed into the third screw hole 61 advances toward the inside (−Z direction side) of the frame 11 by being rotated in a tightening direction, passes through the fourth through hole 62 of the bearing bracket 12, and is pressed against the contact receiver 63 of the second rotor supporter 53.

The second removing bolt 72 is further rotated in a tightening direction in a state in which a distal end of the second removing bolt 72 is pressed against the contact receiver 63 of the second rotor supporter 53. As the second removing bolt 72 rotates in the tightening direction, the second removing bolt 72 advances toward the inside of the frame 11 and pushes the second rotor supporter 53 to move it toward the rotor core 14. The second rotor supporter 53 is pushed by the second removing bolt 72 and moved toward the rotor core 14 so that the third inclined portion 53*ca* of the second rotor supporter 53 is pressed against the fourth inclined portion 54*ba* of the second support member receiver 54.

When the third inclined portion 53*ca* of the second rotor supporter 53 is pressed against the fourth inclined portion 54*ba* of the second support member receiver 54, a position of the rotor shaft 15 with respect to the bearing bracket 12 is fixed. When the position of the rotor shaft 15 with respect to the bearing bracket 12 is fixed, even if the second bearing part 55 is removed from the rotor shaft 15, the rotor core 14 does not fall out from the stator core 13.

FIG. 5 shows a second stage of the operation of removing the second bearing part 55.

As shown in FIG. 5, the second bearing part 55 is removed from the rotor shaft 15 in a state in which the position of the rotor shaft 15 with respect to the bearing bracket 12 is fixed. Specifically, in a state in which the third inclined portion 53*ca* of the second rotor supporter 53 is pressed against the fourth inclined portion 54*ba* of the second support member receiver 54, the second removing bolt 72 is further rotated in the tightening direction. However, the second rotor supporter 53 is pressed against the second support member receiver 54 and cannot move toward the rotor core 14.

Therefore, when the second removing bolt 72 is further rotated in the tightening direction, due to a reaction force received by the second removing bolt 72 from the second rotor supporter 53, the second bearing part 55 moves to the outside of the bearing bracket 12. As a result, the second bearing part 55 is removed from the rotor shaft 15. When the second bearing part 55 is removed from the rotor shaft 15, maintenance and replacement of the second bearing 51 becomes possible. Further, when the second housing 52 is removed from the bearing bracket 12, the second removing bolt 72 is removed from the bearing bracket 12 together with the second bearing part 55.

Also, when the second rotor supporter 53 moves toward the rotor core 14, the gap Sb2 is generated between the inner surface of the bearing bracket 12 and the second rotor supporter 53. This gap Sb2 is covered by the second support 56 from the outer peripheral side in the R direction of the central axis C without any break in the θ direction with respect to the central axis C.

In the above description, for convenience of description, the operation of removing the first bearing 31 and the operation of removing the second bearing 51 have been described separately. However, in an actual disassembling operation, the operation of removing the first bearing part 35 and the operation of removing the second bearing part 55 may proceed at the same time.

Next, a method of reassembling for attaching the first bearing part 35 and the second bearing part 55 to the rotor shaft 15 after maintenance and replacement of the first bearing part 35 and the second bearing part 55 are performed will be described with reference to FIGS. 6 and 7. Here, first, a method of attaching the first bearing part 35 to the rotor shaft 15 will be described.

Figure 6:
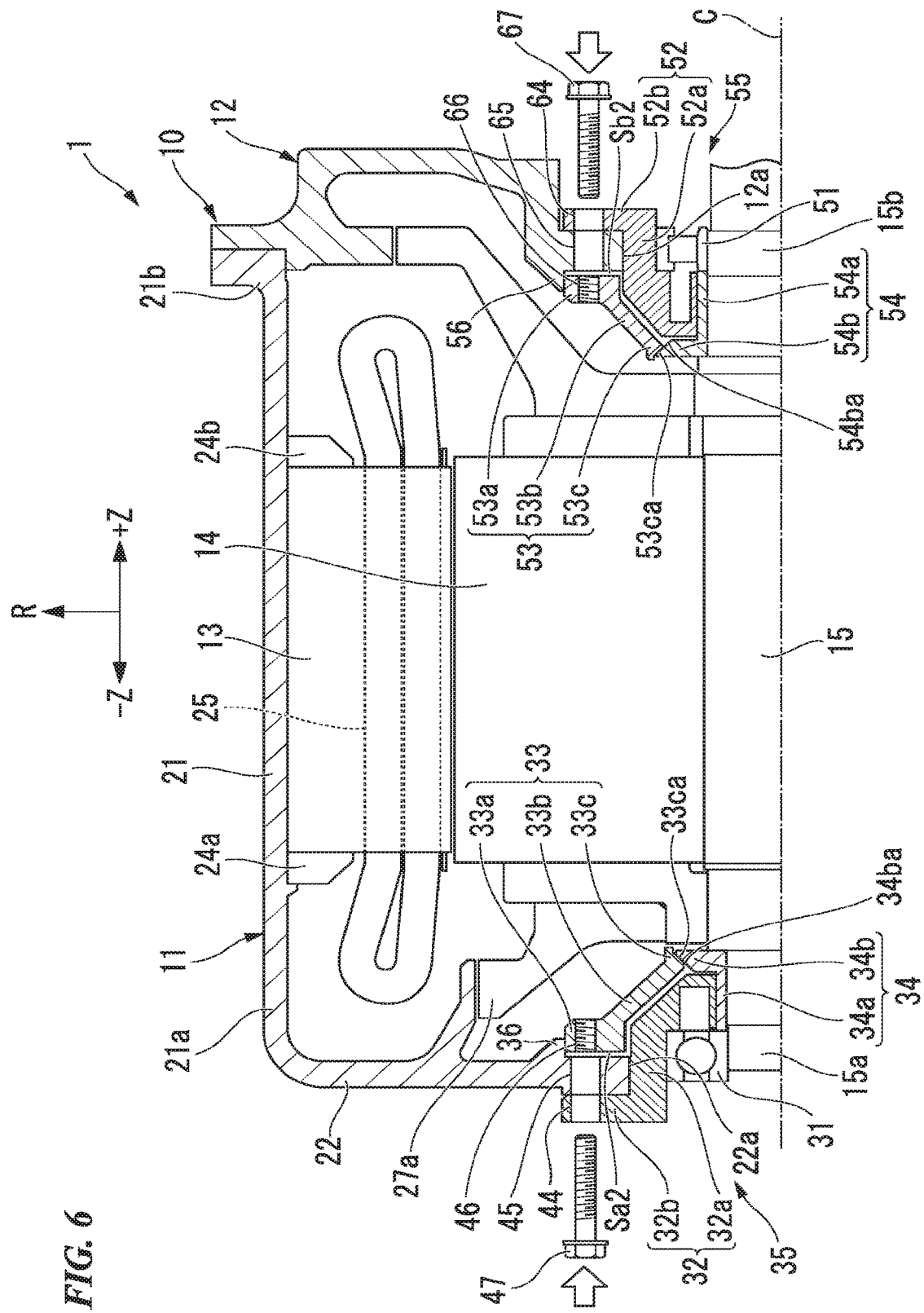
FIG. 6 is a cross-sectional view showing a first stage of an operation of reassembling the electric motor shown in FIG. 1.

FIG. 6 shows a first stage in an operation of attaching the first bearing part 35.

As shown in FIG. 6, in the operation of attaching the first bearing part 35, first, the first bearing 31 is attached to the rotor shaft 15 and the first housing 32 is arranged along the end wall 22 of the frame 11.

After the first housing 32 is arranged along the end wall 22 of the frame 11, the first fixing bolt 47 is inserted into the second through hole 44 of the first housing 32. Specifically, the first fixing bolt 47 is inserted into the second through hole 44 of the first housing 32 from the outside of the frame 11. The first fixing bolt 47 inserted into the second through hole 44 passes through the third through hole 45 of the end wall 22 of the frame 11 and is screwed into the second screw hole 46 of the first rotor supporter 33.

Figure 7:
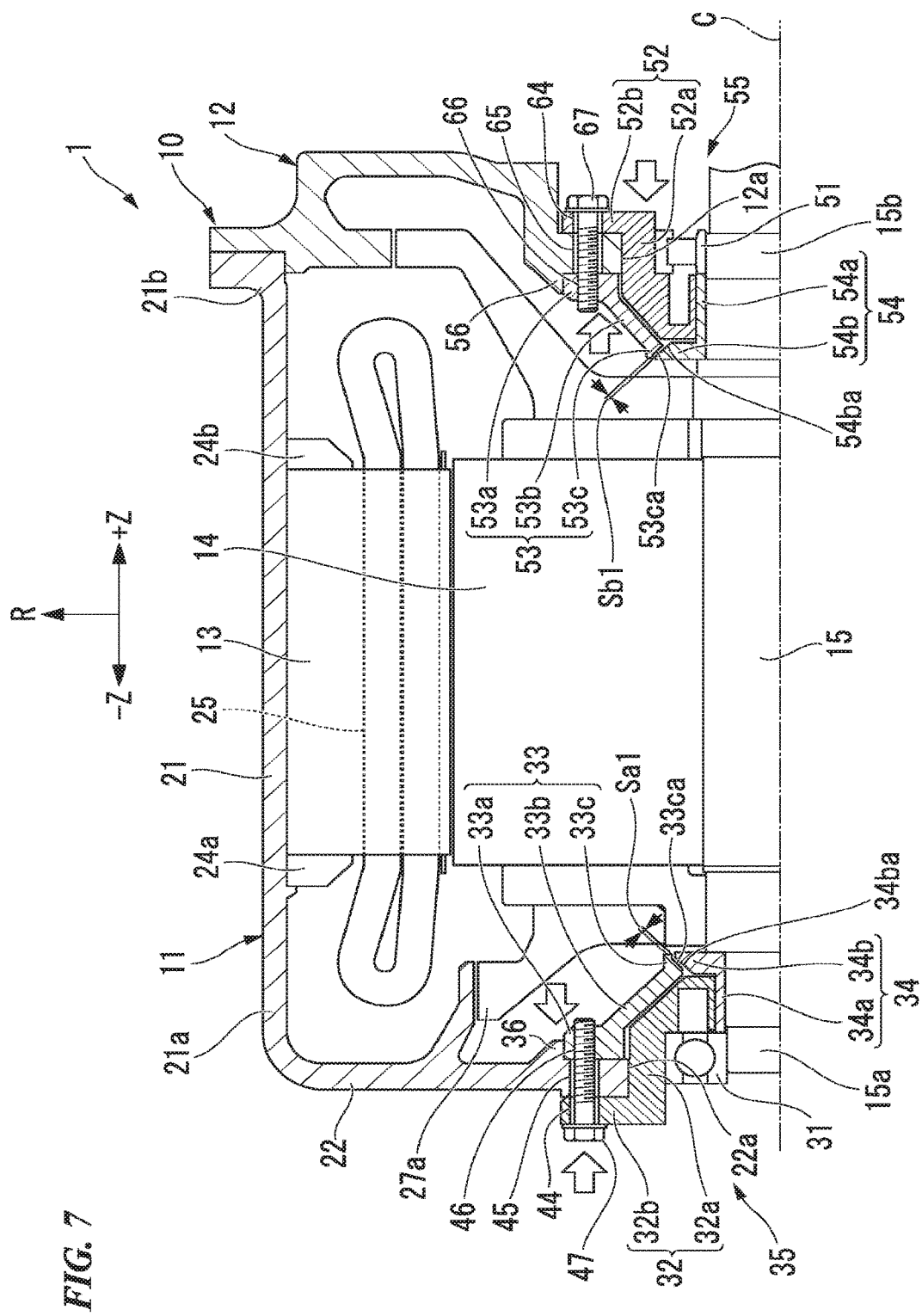
FIG. 7 is a cross-sectional view showing a second stage of the operation of reassembling the electric motor shown in FIG. 1.

FIG. 7 shows a second stage of the operation of attaching the first bearing part 35.

As shown in FIG. 7, the first fixing bolt 47 is further rotated in the tightening direction in a state in which it is screwed into the second screw hole 46 of the first rotor supporter 33. When the first fixing bolt 47 is rotated in the tightening direction, the first rotor supporter 33 moves in a direction away from the rotor core 14. When the first rotor supporter 33 moves in a direction away from the rotor core 14, the very small gap Sa1 is generated again between the first inclined portion 33*ca* of the first rotor supporter 33 and the second inclined portion 34*ba* of the first support member receiver 34. Thereby, the fixing of the rotor shaft 15 to the frame 11 is released and the rotor shaft 15 becomes rotatable. Further, when the first fixing bolt 47 is rotated in the tightening direction, the first bearing part 35 and the first rotor supporter 33 are fixed to the end wall 22 of the frame 11. As a result, the first bearing part 35 is not separated from the frame 11.

Next, a method of attaching the second bearing part 55 to the rotor shaft 15 will be described.

FIG. 6 shows a first stage of an operation of attaching the second bearing part 55.

As shown in FIG. 6, in the operation of attaching the second bearing part 55, first, the second bearing 51 is attached to the rotor shaft 15 and the second housing 52 is arranged along the bearing bracket 12.

Then, after the second housing 52 is arranged along the bearing bracket 12, the second fixing bolt 67 is inserted into the fifth through hole 64 of the second housing 52. Specifically, the second fixing bolt 67 is inserted into the fifth through hole 64 of the second housing 52 from the outside of the bearing bracket 12. The second fixing bolt 67 inserted into the fifth through hole 64 passes through the sixth through hole 65 of the bearing bracket 12 and is screwed into the fourth screw hole 66 of the second rotor supporter 53.

FIG. 7 shows a second stage of the operation of attaching the second bearing 51.

As shown in FIG. 7, the second fixing bolt 67 is further rotated in the tightening direction in a state in which it is screwed into the fourth screw hole 66 of the second rotor supporter 53. When the second fixing bolt 67 is rotated in the tightening direction, the second rotor supporter 53 moves in a direction away from the rotor core 14. When the second rotor supporter 53 moves in a direction away from the rotor core 14, the very small gap Sb1 is generated again between the third inclined portion 53ca of the second rotor supporter 53 and the fourth inclined portion 54ba of the second support member receiver 54. Thereby, the fixing of the rotor shaft 15 to the bearing bracket 12 is released and the rotor shaft 15 becomes rotatable. Further, when the second fixing bolt 67 is rotated in the tightening direction, the second bearing part 55 and the second rotor supporter 53 are fixed to the bearing bracket 12. As a result, the second bearing part 55 is not separated from the bearing bracket 12.

In the above description, for convenience of description, the operation of attaching the first bearing part 35 and the operation of attaching the second bearing part 55 have been described separately. However, in an actual reassembling operation, the operation of attaching the first bearing part 35 and the operation of attaching the second bearing part 55 may proceed at the same time.

According to the electric motor 1 configured as described above, it is possible to facilitate a maintenance operation.

Here, for a comparison, an electric motor in which the operation of fixing the rotor shaft 15 by the first rotor supporter 33 and the operation of separating the first bearing part 35 from the end wall 22 of the frame 11 are separately performed is considered. In an operation of disassembling this electric motor, it is necessary to remove the first bearing part 35 from the end wall 22 of the frame 11 after the rotor shaft 15 is fixed by the first rotor supporter 33. If a mistake is made in this operation procedure, the first bearing part 35 is removed from the rotor shaft 15 in a state in which the rotor shaft 15 is not fixed and thereby there is a possibility of the rotor core 14 falling out from the stator core 13. Also, since two operations such as the operation of fixing the rotor shaft 15 by the first rotor supporter 33 and the operation of removing the first bearing part 35 from the end wall 22 of the frame 11 are separately performed as the disassembling operation of the electric motor, there is a possibility of the disassembling operation becoming complicated.

Further, in the operation of reassembling the above electric motor, the operation of releasing the fixing of the rotor shaft 15 by the first rotor supporter 33 and the operation of fixing the first bearing part 35 to the end wall 22 of the frame 11 are separately performed. Therefore, there is a possibility of only the operation of fixing the first bearing part 35 to the end wall 22 of the frame 11 being performed with mistakenly skipping the operation of releasing the fixing of the rotor shaft 15 by the first rotor supporter 33. When the operation of releasing the fixing of the rotor shaft 15 is mistakenly skipped, there is a possibility that the electric motor may be mounted on a truck in a state in which the rotor shaft 15 is fixed. Also, since two operations such as the operation of releasing the fixing of the rotor shaft 15 by the first rotor supporter 33 and the operation of fixing the first bearing part 35 to the end wall 22 of the frame 11 are separately performed as the reassembling operation of the electric motor, there is a possibility of the reassembling operation becoming complicated.

Therefore, the electric motor 1 of the present embodiment includes the stator core 13, the rotor core 14, the rotor shaft 15, the case 10, the first bearing part 35, the first rotor supporter 33, and the first support member receiver 34. The rotor core 14 is disposed on the inner peripheral side of the stator core 13. The rotor shaft 15 is fixed to the rotor core 14. The case 10 accommodates the stator core 13 and the rotor core 14. The first bearing part 35 rotatably supports the rotor shaft 15. The first rotor supporter 33 is disposed inside the case 10, is supported by the case 10 from the outer peripheral side in the R direction of the central axis C of the rotor shaft 15, and is movable in the axial direction of the central axis C of the rotor shaft 15 with respect to the case 10. The first support member receiver 34 is attached to at least one of the rotor shaft 15 and the rotor core 14 so that the first rotor supporter 33 can be in contact therewith or separated therefrom, and the rotor shaft 15 and the rotor core 14 can be fixed to the first rotor supporter 33 when the first support member receiver 34 comes in contact with the first rotor supporter 33. The case 10 includes the first through hole 42 in the axial direction of the central axis C of the rotor shaft 15. The first rotor supporter 33 includes a contact receiver 43 with which the first removing bolt 71 comes in contact. The contact receiver 43 is disposed to face the first through hole 42. The first bearing part 35 includes the flange 32b facing the case 10 from the outside of the electric motor in the axial direction of the central axis C of the rotor shaft 15 and the first screw hole 41 provided in the flange 32b, and is attached to the case 10 so that the first screw hole 41 is aligned with the first through hole 42.

According to this configuration, at the time of the operation of disassembling the electric motor 1, the first removing bolt 71 is screwed into the first screw hole 41 of the first bearing part 35, and the first removing bolt 71 is brought into contact with the contact receiver 43 of the first rotor supporter 33 through the first through hole 42 of the case 10. Then, in a state in which the first removing bolt 71 is in contact with the contact receiver 43 of the first rotor supporter 33, when the first removing bolt 71 is further rotated in a tightening direction, the first rotor supporter 33 moves to a position at which the first rotor supporter 33 comes in contact with the first support member receiver 34 due to the first removing bolt 71. When the first rotor supporter 33 moves to a position at which it comes into contact with the first support member receiver 34, the rotor shaft 15 and the rotor core 14 are fixed to the first rotor supporter 33 by the first rotor supporter 33 and the first support member receiver 34. When the rotor shaft 15 and the rotor core 14 are fixed to the first rotor supporter 33, even if the first bearing part 35 is removed from the rotor shaft 15, the rotor shaft 15 and the rotor core 14 do not fall out from the stator core 13. Further, when the first removing bolt 71 is further rotated in a tightening direction in a state in which the first rotor supporter 33 is in contact with the first support member receiver 34, the first bearing part 35 moves in a direction away from the rotor shaft 15 due to the reaction force received from the first removing bolt 71. As a result, the first bearing part 35 is removed from the rotor shaft 15.

That is, according to the above configuration, the operation of fixing the rotor shaft 15 and the rotor core 14 by the first rotor supporter 33 and the operation of removing the first bearing part 35 from the case 10 are performed in this order. That is, according to the above configuration, such a case in which the first bearing part 35 is removed from the case 10 before the rotor shaft 15 and the rotor core 14 are fixed to the case 10 does not occur. Therefore, it is possible to alleviate the operator's burden of attention and to facilitate a maintenance operation.

Further, according to the above configuration, by the operation of rotating the first removing bolt 71, the operations of fixing the rotor shaft 15 and the rotor core 14 by the first rotor supporter 33 and the operation of removing the first bearing part 35 from the case 10 are consecutively performed. Therefore, the operation of disassembling the electric motor 1 becomes simple as compared with the electric motor in which the operation of fixing the rotor shaft 15 and the rotor core 14 by the first rotor supporter 33 and the operation of removing the first bearing part 35 from the case 10 are separately performed. Also from this perspective, the electric motor 1 of the present embodiment can facilitate a maintenance operation. Further, the same applies for the second bearing part 55.

In the present embodiment, the first bearing part 35 has the second through hole 44 provided in the flange 32*b*. The case 10 has the third through hole 45 to which the second through hole 44 of the first bearing part 35 is aligned. The first rotor supporter 33 has the second screw hole 46 which is aligned with the third through hole 45 of the case 10. The first fixing bolt 47 that has passed through the second through hole 44 and the third through hole 45 can be screwed into the second screw hole 46.

According to such a configuration, at the time of the operation of assembling the electric motor 1, the first fixing bolt 47 passes through the second through hole 44 of the first bearing part 35 and the third through hole 45 of the case 10, and the first fixing bolt 47 is screwed into the second screw hole 46 of the first rotor supporter 33. Then, in a state in which the first fixing bolt 47 is screwed into the second screw hole 46, when the first fixing bolt 47 is further rotated in a tightening direction, the first rotor supporter 33 is moved to a position away from the first support member receiver 34 by the first fixing bolt 47. When the first rotor supporter 33 moves to a position away from the first support member receiver 34, the fixing of the rotor shaft 15 and the rotor core 14 due to the first rotor supporter 33 is released. Also, when the first fixing bolt 47 is further rotated in a tightening direction, the first bearing part 35 is fixed to the case 10 by the first fixing bolt 47. As a result, the first bearing part 35 is not separated from the case 10.

That is, according to the above configuration, the operation of releasing the fixing of the rotor shaft 15 and the rotor core 14 by the first rotor supporter 33 and the operation of fastening the first bearing part 35 to the case 10 are performed in this order. That is, according to the above configuration, such a case in which the operation of releasing the fixing of the rotor shaft 15 and the rotor core 14 is mistakenly skipped and the operation of assembling the electric motor 1 is completed in a state in which the rotor shaft 15 and the rotor core 14 are fixed does not occur. Therefore, it is possible to alleviate the operator's burden of attention and to facilitate a maintenance operation.

Further, according to the above configuration, by the operation of rotating the first fixing bolt 47, the operation of releasing the fixing of the rotor shaft 15 and the rotor core 14 by the first rotor supporter 33 and the operation of fastening the first bearing part 35 to the case 10 are consecutively performed. Therefore, the operation of disassembling the electric motor 1 becomes simple as compared with the electric motor in which the operation of releasing the fixing of the rotor shaft 15 and the rotor core 14 by the first rotor supporter 33 and the operation of fastening the first bearing part 35 to the case 10 are separately performed. Also from this perspective, the electric motor 1 of the present embodiment can facilitate a maintenance operation. Further, the same applies for the second bearing part 55.

In the present embodiment, the first rotor supporter 33 has the first surface 37 facing the inner surface of the case 10 in the axial direction of the central axis C of the rotor shaft 15. The inner surface of the case 10 has the second surface 38 facing the first surface 37 of the first rotor supporter 33. The case 10 includes the first support 36 which supports the first rotor supporter 33 from the outer peripheral side in a radial direction with respect to the central axis C of the rotor shaft 15. When viewed from the outer circumferential side in the radial direction with respect to the central axis C of the rotor shaft 15, the first support 36 covers the first surface 37 of the first rotor supporter 33, the second surface 38 of the case 10, and a gap Sa2 between the first surface 37 and the second surface 38 without a break over the entire circumference in the θ direction with respect to the central axis C of the rotor shaft 15.

According to such a configuration, when the first rotor supporter 33 moves toward the rotor core 14 and the gap Sa2 is generated between the first rotor supporter 33 and the inner surface of the case 10, the gap Sa2 is covered with the first support 36 of the case 10 without a break over the entire circumference in the θ direction with respect to the central axis C of the rotor shaft 15.

That is, according to the above configuration, even when the first rotor supporter 33 moves toward the rotor core 14 and a gap Sa2 is generated between the first rotor supporter 33 and the inner surface of the case 10, waste and dust are prevented from entering the gap Sa2. When waste and dust are prevented from entering the gap Sa2 between the first rotor supporter 33 and the inner surface of the case 10, the first rotor supporter 33 can be reliably returned to its original position after releasing the fixing of the rotor shaft 15 and the rotor core 14 due to the first rotor supporter 33. Thereby, it is possible to prevent occurrence of such a problem in which waste and dust are caught between the first rotor supporter 33 and the inner surface of the case 10 and thus fixing of the rotor shaft 15 and the rotor core 14 cannot be released. The same applies for the second support 56 of the bearing bracket 12.

The electric motor 1 of one embodiment has been described above. However, the electric motor of the embodiment is not limited to the above example. For example, the structure of the present embodiment can be applied to an electric motor of a frameless structure. The electric motor of a frameless structure includes a first bracket in which a first stator core presser is provided, a second bracket in which a second stator core presser is provided, and a tile plate in a circular arc shape provided between the first stator core presser and the second stator core presser. In such a configuration, the first bracket, the second bracket, and the tile plate are brought together to form an example of a "case."

Further, the first partition plate 27*a* and the second partition plate 27*b* may not be provided.

In at least one embodiment described above, the electric motor 1 includes a rotor supporter which is movable in an axial direction of a central axis of a rotor shaft with respect to a case, and a support member receiver attached to at least one of the rotor shaft and a rotor core so that the rotor supporter can be in contact therewith or separated therefrom and capable of fixing the rotor shaft and the rotor core to the rotor supporter when the support member receiver comes in contact with the rotor supporter. The case has a first through hole. The rotor supporter includes a contact receiver with which a bolt can come in contact, and the contact receiver is disposed to face the first through hole. A bearing part includes a flange facing the case from the outside of the electric motor and a first screw hole provided in the flange, and is attached to the case so that the first screw hole is aligned with the first through hole. According to such a configuration, a maintenance operation of the electric motor can be facilitated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric motor comprising:
   a stator core;
   a rotor core disposed on an inner peripheral side of the stator core;
   a rotor shaft fixed to the rotor core;
   a case which accommodates the stator core and the rotor core;
   a bearing part which rotatably supports the rotor shaft;
   a rotor supporter disposed inside the case, supported by the case from an outer peripheral side in a radial direction with respect to a central axis of the rotor shaft, and movable in an axial direction of the central axis of the rotor shaft with respect to the case; and
   a support member receiver attached to at least one of the rotor shaft and the rotor core so that the rotor supporter is able to come into contact therewith and be separated therefrom, and able to fix the rotor shaft and the rotor core to the rotor supporter when the rotor supporter is in contact therewith, wherein
   the case includes a first through hole in the axial direction of the central axis of the rotor shaft,
   the rotor supporter includes a contact receiver with which a bolt is able to come into contact,
   the contact receiver is disposed to face the first through hole, and
   the bearing part includes a flange facing the case from the outside of the electric motor in the axial direction of the central axis of the rotor shaft and a first screw hole provided in the flange, and is attached to the case so that the first screw hole is aligned with the first through hole.

2. The electric motor according to claim 1, wherein:
   the bearing part has a second through hole provided in the flange;
   the case has a third through hole with which the second through hole of the bearing part is aligned; and
   the rotor supporter has a second screw hole which is aligned with the third through hole of the case, and a bolt which has passed through the second through hole and the third through hole is able to be screwed into the second screw hole.

3. The electric motor according to claim 1, wherein:
   the rotor supporter has a first surface which faces an inner surface of the case in the axial direction of the central axis of the rotor shaft;
   the inner surface of the case has a second surface which faces the first face of the rotor supporter;
   the case includes a support which supports the rotor supporter from an outer peripheral side in the radial direction with respect to the central axis of the rotor shaft; and
   the support covers the first surface of the rotor supporter, the second surface of the case, and a gap between the first surface and the second surface without a break over an entire circumference in a circumferential direction with respect to the central axis of the rotor shaft when viewed from the outer peripheral side in the radial direction with respect to the center axis of the rotor shaft.

* * * * *